United States Patent
Maeda et al.

[11] Patent Number: 6,158,263
[45] Date of Patent: Dec. 12, 2000

[54] ROLL SUPPORTING DEVICE FOR A ROLLING MILL ARRANGEMENT

[75] Inventors: Kikuo Maeda, Mie-ken; Shinobu Nasu, Suzuka; Hideshi Nishiwaki, Yokaichi, all of Japan

[73] Assignee: NTN Corporation, Osaka-fu, Japan

[21] Appl. No.: 09/335,923

[22] Filed: Jun. 18, 1999

[30] Foreign Application Priority Data

Jun. 24, 1998 [JP] Japan .................................. 10-177558

[51] Int. Cl.$^7$ ............................ B21B 31/00; B21B 31/07
[52] U.S. Cl. ............................................. 72/237; 148/906
[58] Field of Search .................................. 72/237, 252.5, 72/244; 148/906, 319, 218; 384/625, 569, 571, 558

[56] References Cited

U.S. PATENT DOCUMENTS

| | | | |
|---|---|---|---|
| 5,336,338 | 8/1994 | Toda | 148/906 |
| 5,338,377 | 8/1994 | Mitamura | 148/906 |
| 5,626,974 | 5/1997 | Mitamura | 148/906 |

*Primary Examiner*—Rodney A. Butler
*Attorney, Agent, or Firm*—Arent Fox Kintner Plotkin & Kahn, PLLC

[57] ABSTRACT

A roll supporting device for a rolling mill arrangement, supporting rolls rotatably to housings by double row roller bearings or multi-row roller bearings. On surfaces of bearing rings and rollers of the roller bearing are provided carbonitrided layers of 0.80% or greater in carbon content and of Rockwell hardness HRC 58 or greater. The carbonitrided layers are formed to contain residual austenite content of 25–30% by volume. By virtue of the carbonitrided layers, the strength against the surface-initiated type damage to the contact surfaces of the bearing rings and the rollers is improved, so that the enhancement of the life of the roll supporting device, especially the lives of the bearing portions thereof, can be achieved to contribute to the prolongation of inspection and maintenance periods and to the reduction of inspection and maintenance costs.

5 Claims, 3 Drawing Sheets

ROLL SUPPORTING DEVICE FOR A ROLLING MILL ARRANGEMENT

BACKGROUND OF THE INVENTION

The present invention relates to a device for supporting rolls rotatably in an arrangement such as a rolling mill in a steel plate rolling line.

For example, molten steel having completed its refining is cast into slabs by continuous casting before rolling-worked into strips (band steels) using a hot strip mill (hot rolling mill). The slabs are heated up to rolling temperatures in a heating furnace in advance of the rolling, and fed to a rough finishing strand and a finishing strand of the hot strip mill successively, thereby being hot rolled to a prescribed wall thickness. Then, the strips (band steels) out of the finishing strand of the hot strip mill are cut into regular sizes by a flying shear, or reeled into a coil shape by a coiler; and those reeled by the coiler are, for example, subjected to processing such as pickling before cold rolled by a cold strip mill (cold rolling mill).

Rolling mills in steel plate rolling equipment as described above include many types such as a two-stage rolling mill, a three-high rolling mill, a four-high rolling mill, a multi-high rolling mill, and a Steckel rolling mill. A four-high rolling mill, for example, has such a configuration that the rolling of materials are performed between a pair of work rolls of relatively small diameter, above and below which backup rolls of relatively large diameter are arranged to prevent the deflection resulting from the rolling load of the work rolls. The respective rolls are supported rotatably to housings by double row or multi-row roller bearings, and the housings are supported by roll stands. Owing to load conditions, ambient temperatures, and the presence of foreign matter such as cooling water, water vapor, and scale, roll supporting apparatuses of this type are under a severe condition in the lubrication inside the roller bearings, and the design for the extension of life is one of major problems.

SUMMARY OF THE INVENTION

Through perpetual studies on bearing damage analyses, it was confirmed by the applicant of the present invention that: damage to large-sized bearings mounted in a roll supporting apparatus of this type mostly consists of spalling initiated from the indentation caused by the biting of foreign matter, peeling and smearing caused by an insufficient lubricating oil film, and cracks initiated from such things; and the enhancing of the strength against the damage being initiated from the surfaces (surface-initiated type damage) leads to the extension of life.

In the view of the foregoing, an object of the present invention is to extend the life of a roll supporting device of this type, especially the lives of bearing portions thereof, to contribute to the prolongation of inspection and maintenance periods and to the reduction of inspection and maintenance costs.

In order to achieve the foregoing object, the present invention is to provide a roll supporting device for a rolling mill arrangement, supporting rolls rotatably to housings by double row or multi-row roller bearings, wherein carbonitrided layers of 0.80% or greater in carbon content and of Rockwell hardness HRC 58 or greater are provided on surfaces of bearing rings and rollers of the roller bearing, and the carbonitrided layers are formed to contain retained austenite content of 25–30% by volume. Here, "HRC" represents the C scale of Rockwell hardness.

The carbonitrided layers are formed on the contact surfaces of the bearing rings and the rollers for the following reason. The retained austenite in a carburized layer obtained by ordinary carburization deters the production and the development of cracks, and gets work hardened (strengthened) in use, so that the appropriate content of the same can toughen the material; however, the retained austenite is unstable to heat. Here, when nitrogen is compounded therein under appropriate conditions, the intrusion of nitrogen causes the retained austenite and martensite, the matrix, to be stable to heat, resulting in hardly-changing materials, and an adequate amount of carbide is precipitated, allowing an increase in fatigue strength without lowering the crack strength.

The carbonitrided layers are formed to contain a retained austenite content of 25–35% by volume, in order to give appropriate toughness to the carbonitrided layers to absorb the generation of stress in response to the plastic deformation caused by the surface indentation of foreign matter mixed into the lubricating oil. Retained austenite contents below 25% are not enough to absorb the generation of stress resulting from the plastic deformation, and retained austenite contents above 35% decrease the surface hardness, resulting in larger plastic deformation and deteriorated surface roughness.

The size of the retained austenite structure may be preferably 10 $\mu$m or smaller. Here, the size of the retained austenite structure means a size represented by the diameter of a circle having the dimension equivalent to that of one structure of austenite on the polished and etched sample surface under a microscope. The size is provided to be 10 $\mu$m or smaller for the reason that, in order to cope with the immixing of small sized foreign matter, the number of retained austenite phases included in the indentation of the foreign matter is to be secured so that the indentation stress of the foreign matter is eased to avoid the generation of cracks on the surface layer.

The bearing rings and rollers of the above-mentioned roller bearing may be made of blister steel of 0.12–0.40% in carbon content, and the amount of residual carbide in the above-mentioned carbonitrided layers may be preferably 10% or lower.

The residual carbide mainly consists of residuals of post-quenching carbide which is not dissolved in the austenite phases during heating process in quenching, and the amount of residual carbide is shown by percentage of the occupied dimension in the cross section of a sample under a microscopic examination. The amount of residual carbide is confined to 10% or lower so that the amount of solid-solute carbon is increased to improve the strength of the matrix so as to diminish the effects of the plastic deformation caused by the press of foreign matter reaching the inside of the surface layer, and that the softening of the hardened layer caused by a temperature increase in use is prevented to secure fatigue-resisting life thereof under harsh use conditions.

The structure of the carbonitrided layer as described above is formed by carbonitriding after carburization. The oil quenching is performed after heating is performed for a prescribed time in the carburizing atmosphere with a carbon potential of 0.8% or greater (generally, a diffusion process is involved). Then, the carbonitriding is applied to the carburized layers formed by the carburization process, and the quenching is performed immediately after that. In this connection, the carbonitriding may be performed in the process of carburization at the same time.

An increment of nitrogen content in the carburized layers leads to increase the amount of the solid-solute carbon, which decreases the amount of residual carbide but stabilizes austenite. Accordingly, the quenching temperature after the carbonitriding is decreased to 800–840° C. to adjust the size of structure and the amount of the post-quenching retained austenite within the above-mentioned prescribed ranges. As described above, even in the cases where the austenitizing temperature is lowered to 800–840° C., an increment of nitrogen content in the carburized layer increases the amount of solid-solute carbon in the austenite and decreases the amount of residual carbide, so that the amount of residual carbide can be confined to 10% or lower. In this connection, subzero treatment or high temperature tempering may be also performed to adjust the amount of retained austenite.

According to the present invention, since carbonitrided layers of 0.80% or greater in carbon content and of Rockwell hardness HRC 58 or greater are formed on surfaces of the bearing rings and the rollers of the double-row or multi-row roller bearings and the carbonitrided layers are provided to be 25–30% by volume of retained austenite, the strength against the surface-initiated type damage to the contact surfaces of the bearing rings and the rollers is improved, and the extension of the life of the roll supporting apparatus of this type, especially the lives of bearing portions thereof, can be achieved, contributing to the prolongation of inspection and maintenance periods and to the reduction of inspection and maintenance costs.

BRIEF EXPLANATION OF THE DRAWINGS

In the accompanying drawings:

FIG. 2A is an exploded view of case hardened steel with carbonitrided surface layers formed over core portions.

DESCRIPTION OF THE PREFERRED EMBODIMENT

Figure 1:
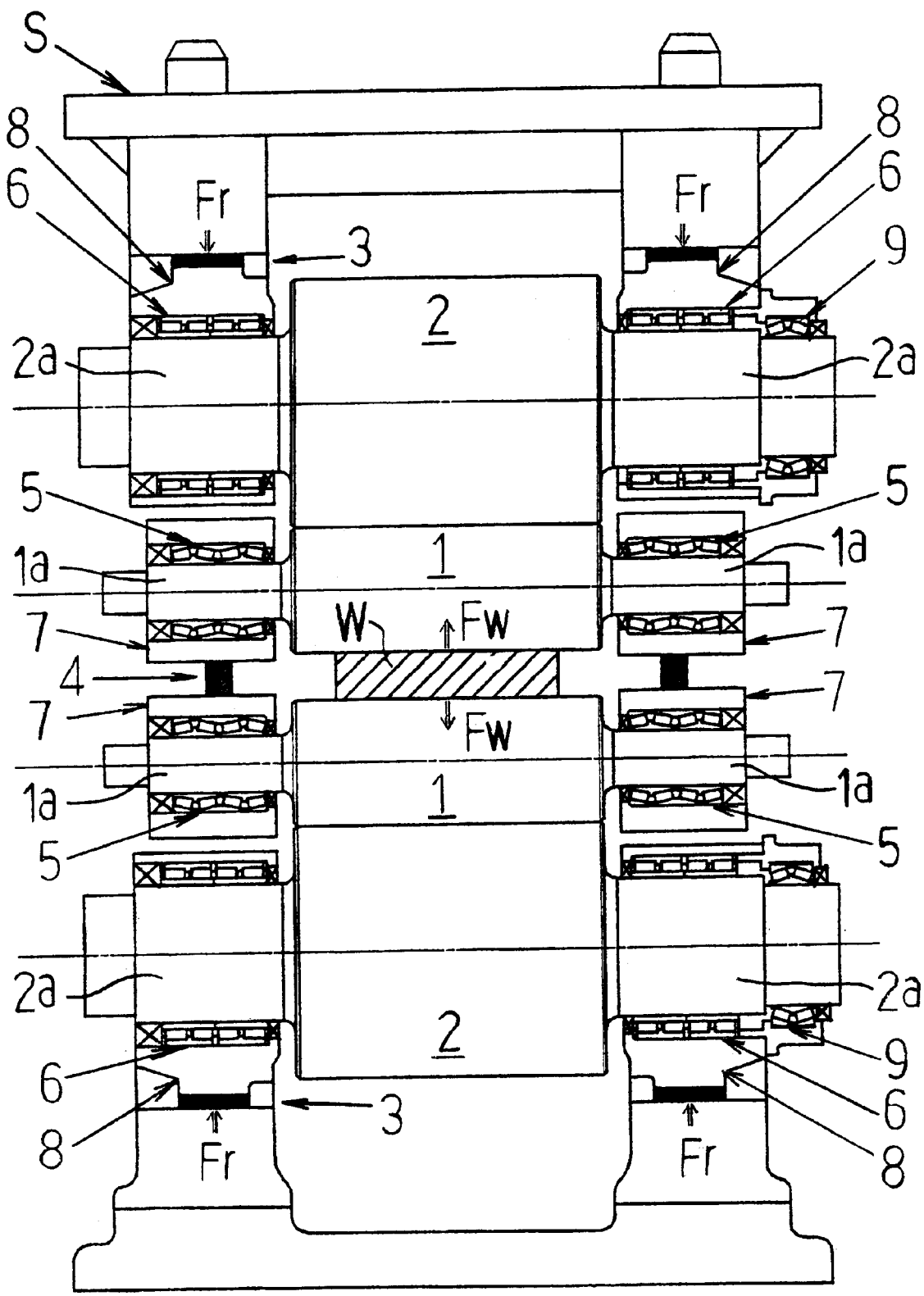
FIG. 1 is a cross-sectional view showing a structural model of a four-high hot rolling mill.

Hereinafter, an embodiment of the present invention will be described. FIG. 1 illustrates a structural model of a four-high hot rolling mill. The four-high hot rolling mill constitutes, for example, a finishing strand of a hot strip mill (a plurality of the same are arranged along the hot rolling line), and has such a configuration that the rolling of a work W is performed with a pair of work rolls 1 of relatively small diameter, above and below which backup rolls 2 of relatively large diameter are arranged to prevent the deflection resulting from rolling loads Fw of the work rolls 1. Pressure devices 3 such as a hydraulic power unit apply thrusting forces Fr to the backup rolls, pressure devices 4 such as a hydraulic power unit are interposed between the upper and lower work rolls 1, and the thrusting forces of the pressure devices 4 give bending deformation to the work rolls 1, thereby controlling the wall thickness of the work W in width direction.

The shaft ends 1a, 2a of the rolls 1, 2 are supported rotatably to housings 7, 8 by roller bearings 5, 6, respectively; and the respective housings 7, 8 are supported by a roll stand S. In the present embodiment, four-row tapered roller bearings are used as the roller bearings 5 for supporting the shaft ends 1a of the work rolls 1, and four-row cylindrical roller bearings are used as the roller bearings 6 for supporting the shaft ends 2a of the backup rolls 2. Besides, in order to support relatively small axial loads acting on the backup rolls 2, double row tapered roller bearings 9 of relatively large cone angle are arranged on the lateral side of the four-row cylindrical roller bearings 6 at one shaft ends 2a. Both ends of each roll supporting apparatus are respectively sealed by sealing mechanisms to avoid the intrusion of foreign matter such as cooling water, water vapor and scale into the bearing portions of the supporting apparatus.

Figure 2:
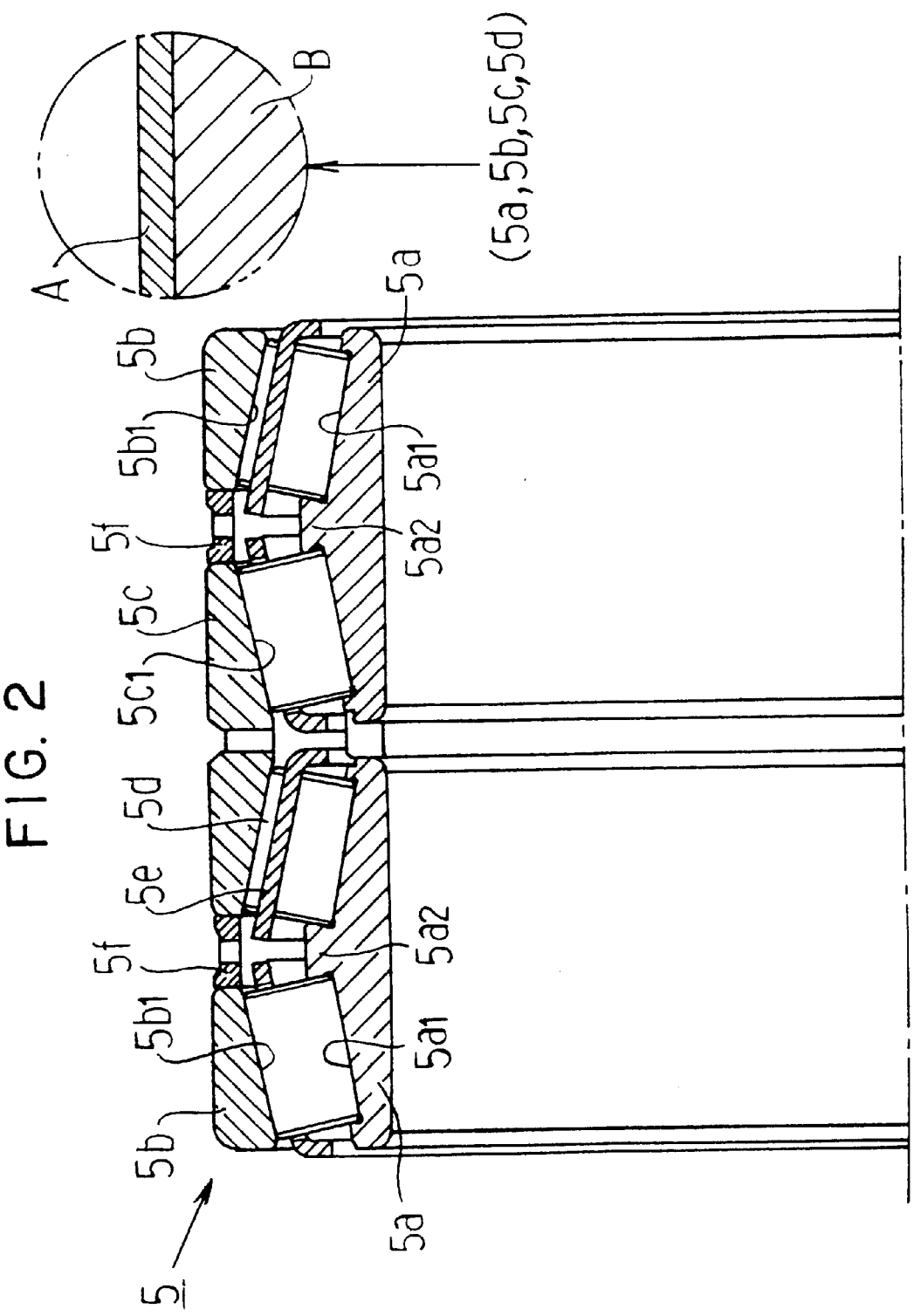
FIG. 2 is a cross-sectional view showing an embodiment of a four-row tapered roller bearing.

FIG. 2 illustrates an embodiment of the four-row tapered roller bearing 5 for supporting the shaft end 1a of the work roll 1 rotatably to the housing 7. The tapered roller bearing 5 comprises a pair of inner rings 5a having two rows of raceway surfaces 5a1, a pair of outer rings 5b having a single row of raceway surface 5b1 respectively, an outer ring 5c having two rows of raceway surfaces 5c1, four rows of tapered rollers 5d arranged free to rolling between the raceway surfaces 5a1 of the inner rings 5a and the raceway surfaces 5b1, 5c1 of the outer rings 5b, 5c, and retainers 5e for retaining the tapered rollers 5d at prescribed circular intervals. Centre ribs 5a2 are provided at the central parts of the respective inner rings 5a, and the tapered rollers 5d roll on the raceway surfaces being contact guided with the centre ribs 5a2 when the bearing is operated. In this connection, between the outer rings 5b and the outer ring 5c are interposed spacers 5f which also serve as greasing members.

The inner rings 5a, the outer rings 5b, 5c, and the tapered rollers 5d are respectively formed of case hardening steel (such as SNCM815, SNCM420, SCM420, SCr435, and SCM435) in carbon content of 0.12–0.40%, preferably of 0.12–0.35%, and on the surfaces of these parts are formed carbonitrided layers A of 0.80% or greater in carbon content, of Rockwell hardness HRC 58 or greater, and of 25–35% by volume of retained austenite (shown in the dash-lined circle in FIG. 2A). The retained austenite in the carbonitrided layers A is preferably 10 μm or lower in size of structure and 10% or lower in residual carbide content. Besides, the respective depths of the carbonitrided layers A in the inner rings 5a, the outer rings 5b, 5c, and the tapered rollers 5d are 0.02 or greater with respect to the averaged diameter (the average between the diameters at the large-diametered side and the small-diametered side) of the tapered roller 5d, and the hardness of the core portions B is below HRC 58 in Rockwell hardness, preferably below HRC 50, in order to secure appropriate toughness of materials and to form compressive stresses in the surface layers. Note that it is enough for the carbonitrided layers A to be formed at least on friction-causing contact surfaces, i.e., the raceway surfaces 5a1 of the inner rings 5a, the flange surfaces of the centre ribs 5a2, the raceway surfaces of the outer rings 5b, 5c, and the rolling surfaces and larger end surfaces of the tapered rollers 5d.

Figure 3:
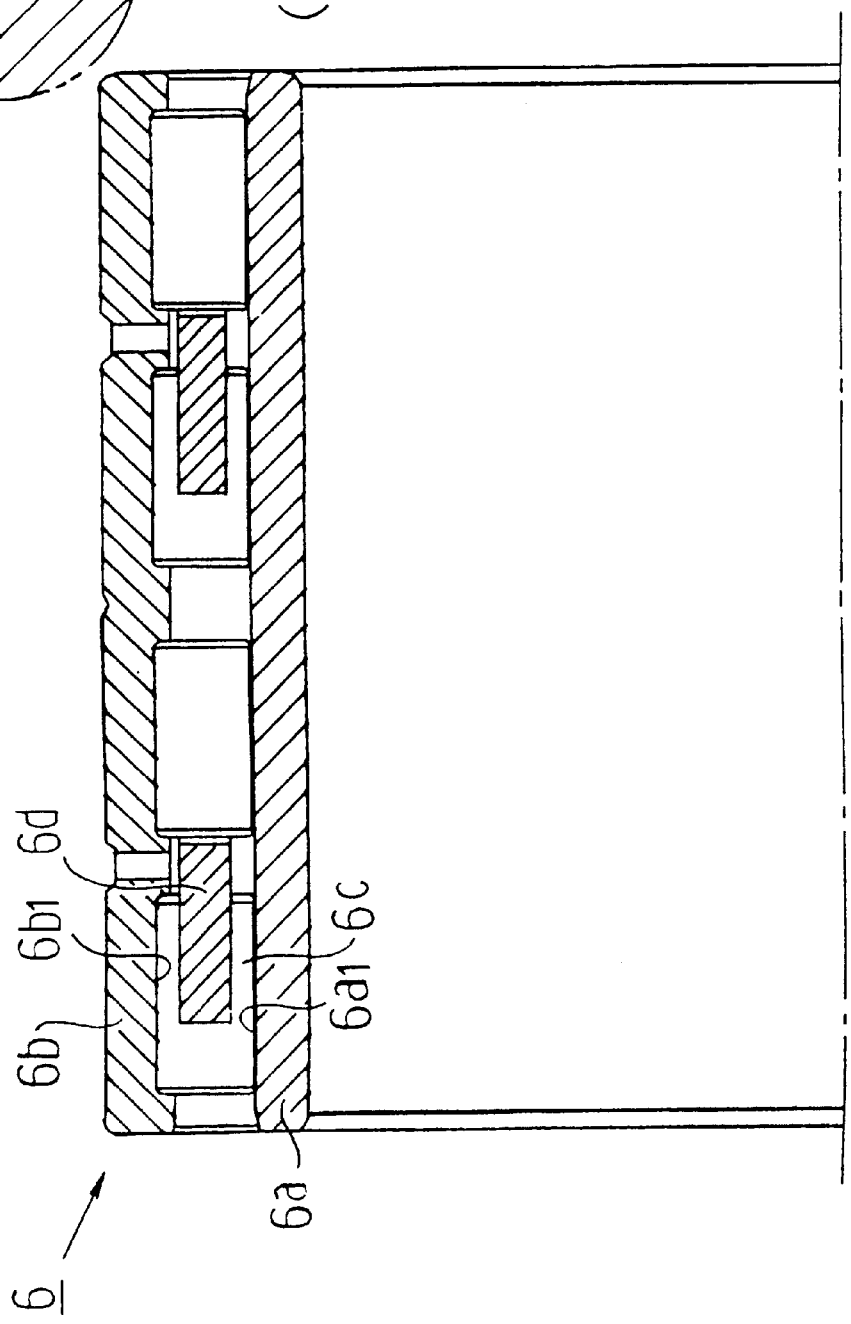
FIG. 3 is a cross-sectional view showing an embodiment of a four-row cylindrical roller bearing.

FIG. 3 illustrates an embodiment of the four-row cylindrical roller bearing 6 for supporting the shaft end 2a of the backup roll 2 rotatably to the housing 8. The cylindrical roller bearing 6 comprises an inner ring 6a having four rows of raceway surfaces 6a1, an outer ring 6b having four rows of raceway surfaces 6b1, four rows of cylindrical rollers 6c arranged free to roll between the raceway surfaces 6a1 of the inner ring 6a and the raceway surfaces 6b1 of the outer ring 6b, and retainers 6d for retaining the cylindrical rollers 6c at prescribed circular intervals.

Figure 3A:
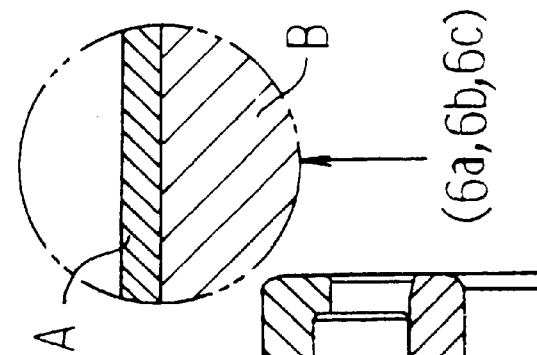
FIG. 3A is an exploded view of case hardened steel with carbonitrided surface layers formed over core portions.

The inner ring 6a, the outer ring 6b, and the cylindrical rollers 6c are respectively formed of case hardening steel (such as SNCM815, SNCM420, SCr435, and SCM435) in carbon content of 0.12–0.40%, preferably 0.12–0.35%, and on the surfaces of these parts are formed carbonitrided layers A of 0.80% or greater in carbon content, of HRC 58 or greater in Rockwell hardness and of 25–35% by volume of retained austenite (shown in the dash-lined circle in FIG. 3A). Since the other points are the same as those of the above-described tapered roller bearing 5, the redundant descriptions will be omitted.

In order to evaluate the effects of the formation of the above-mentioned carbonitrided layers A and the effects of the provision of the carbonitrided layers A with the residual austenite content of 25–35% by volume, life tests have been performed according to the following method:

Test Method

Test Bearings:

1̂ Tapered roller bearing (carbonitrided article)

Inner diameter of ø30 mm, outer diameter of ø62 mm

Inner ring, outer ring, roller→case hardening steel (SCr435)+carbonitrided layer A Varieties with carbonitrided layers A below 20, of 22, 25, 28, 30, 32, 35, 40, and 46 in retained austenite content (volume percent) are fabricated.

2̂ Tapered roller bearing (standard carburized article)

Inner diameter of ø30 mm, outer diameter of ø62 mm

Inner ring, outer ring, roller→blister steel (SCR435)+ carburized layer Residual austenite content (volume percent) of 28% in the carburized layers Test Condition:

Load; Radial load 17.64 KN

Revolution of speed; 2000 rpm

Lubricating oil; Turbine VG56 oil bath or bathing

Foreign matter; 100–180 µm in particle size
HV 700–800 in hardness Gas atomized powders
Mixed amount of 1 gram/liter of oil Test method:

With respect to the each type of test bearings, multiple of the same are operated under the above-mentioned test condition. The life ($L_{10}$ life) is taken as the time in which 90% of the same rotate without suffering surface-initiated type damage.

Test Result

The test results are shown en bloc in Table 1. Here, the life ratios in Table 1 are the $L_{10}$ lives of the above-mentioned test bearings 1̂ shown in ratio assuming the $L_{10}$ life of the above-mentioned test bearing 2̂ (standard carburized article: retained austenite content of 28% by volume) as 1.

As shown in Table 1, it is found that the test bearings 1̂ having the carbonitrided layers formed are increased in life as compared to the standard carburized article 2̂ regardless of the retained austenite content thereof. Especially, remarkable effects are obtained in the range of 25–35% by volume of retained austenite content, in which the lives are improved up to three times or more that of the standard carburized article 2̂.

The above-mentioned test results show that the provision of carbonitrided layers with the retained austenite content in the range of 25–35% by volume is particularly effective to extend the life of roll supporting apparatuses of this type, especially the life of the bearing portions thereof.

It should be noted that the roller bearings are not limited in configuration to those shown in FIG. 2 and FIG. 3, and may be double row type bearings and sealed type bearings having sealing members mounted to the both end portions, for example. Besides, the roller bearings may be self-aligning roller bearings. Moreover, the present invention is not limited to the roll supporting apparatuses of a hot rolling mill, and is widely applicable to those of other rolling mills such as a cold rolling mill.

While there has been described what are at present considered to be a preferred embodiment of the invention, it will be understood that various modifications may be made thereto, and it is intended that the appended claims cover all such modifications as fall within the true spirit and scope of the invention.

TABLE 1

| RESIDUAL AUSTENITE (VOLUME %) | LESS THAN 20 | 22 | 25 | 28 | 30 | 32 |
|---|---|---|---|---|---|---|
| LIFE RATIO | 2.0 | 2.2 | 3.4 | 3.2 | 3.0 | 3.0 |
| RESIDUAL AUSTENITE (VOLUME %) | 35 | 40 | 46 | | | |
| LIFE RATIO | 2.6 | 2.2 | 1.8 | | | |

LIFE RATIO IS REPRESENTED WITH TAKING LIFE OF STANDARD CARBURIZED ARTICLE (RETAINED AUSTENIRE CONTENT: 28 VOLUME %) AS 1.0

What is claimed is:

1. A roll supporting device for a rolling mill arrangement, said device supporting rolls rotatably to housings by double row or multi-row roller bearings, wherein carbonitrided layers of 0.80% or greater in carbon content and of Rockwell hardness HRC 58 or greater are provided on surfaces of bearing rings and rollers of said roller bearing, and the carbonitrided layers are formed to contain retained austenite content of 25–30% by volume.

2. A roll supporting device for a rolling mill arrangement according to claim 1, wherein said roller bearing is a four-row roller bearing.

3. A roll supporting device for a rolling mill arrangement according to claim 1, wherein said roller bearing is a tapered roller bearing.

4. A roll supporting device for a rolling mill arrangement according to claim 1, wherein said roller bearing is a cylindrical roller bearing.

5. A roll supporting device for a rolling mill arrangement according to claim 1, wherein said roller bearing is a self-aligning roller bearing.

* * * * *